United States Patent [19]

Millouet et al.

[11] Patent Number: 4,460,986

[45] Date of Patent: Jul. 17, 1984

[54] METHOD OF SEISMIC EXPLORATION USING ACOUSTIC DIAGRAPHY

[75] Inventors: Jean Millouet, La Celle Saint Cloud; Philippe Staron, Mennecy, both of France

[73] Assignee: Societe Nationale Elf Aquitaine (Production), Courbevoie, France

[21] Appl. No.: 296,532

[22] Filed: Aug. 26, 1981

Related U.S. Application Data

[63] Continuation of Ser. No. 56,182, Jul. 10, 1979, abandoned.

[30] Foreign Application Priority Data

Jul. 18, 1978 [FR] France ................ 78 21226

[51] Int. Cl.$^3$ .................... G01V 1/40; G01V 1/36
[52] U.S. Cl. ........................ 367/27; 367/40; 181/102
[58] Field of Search ............... 367/25–34, 367/40, 41, 57, 58; 181/102

[56] References Cited

U.S. PATENT DOCUMENTS

| | | | |
|---|---|---|---|
| 2,021,943 | 11/1935 | McCollum | 367/57 |
| 2,889,000 | 6/1959 | Silverman et al. | 367/40 |
| 3,302,166 | 1/1967 | Zemanek | 367/25 |
| 3,330,374 | 7/1967 | Broussard et al. | 367/32 |
| 3,571,788 | 3/1971 | Backus et al. | 367/40 |
| 3,629,798 | 12/1971 | Rockwell | 367/57 |
| 3,629,801 | 12/1971 | Brede | 367/40 |
| 4,064,401 | 12/1977 | Silverman | 367/40 |
| 4,101,867 | 7/1978 | Martin | 367/58 |
| 4,210,965 | 7/1980 | Ingram | 367/32 |
| 4,210,966 | 7/1980 | Ingram | 367/25 |
| 4,320,469 | 3/1982 | Frawley et al. | 367/40 |
| 4,367,541 | 1/1983 | Seeman | 367/31 |

FOREIGN PATENT DOCUMENTS

989059 11/1971 Canada ................ 367/56

OTHER PUBLICATIONS

Aran et al., "Formation . . . Logging . . . Techniques", 10/3/78, pp. 1–11, 53rd Ann. Fall Tech. Conf. of AIME.

Bernhardt et al., "Encoding Techniques . . . ", 3/78, pp. 184–193, Geophys. Prosp., vol. 26, #1.

*Primary Examiner*—Nelson Moskowitz
*Attorney, Agent, or Firm*—Schwartz, Jeffery, Schwaab, Mack, Blumenthal & Koch

[57] ABSTRACT

A method of seismic exploration using acoustic logging comprises transmitting and receiving sound waves, recording all of the signals received by the receivers, the respective positions of the emitter-receiver pair which give rise to each recording, grouping the recordings in pairs so that each recording of a given pair of sound paths have a common path segment and a part which is not common to both which is located facing the geological stratum of interest and the difference in time of arrival for at least one type of wave is measured for each pair.

5 Claims, 12 Drawing Figures

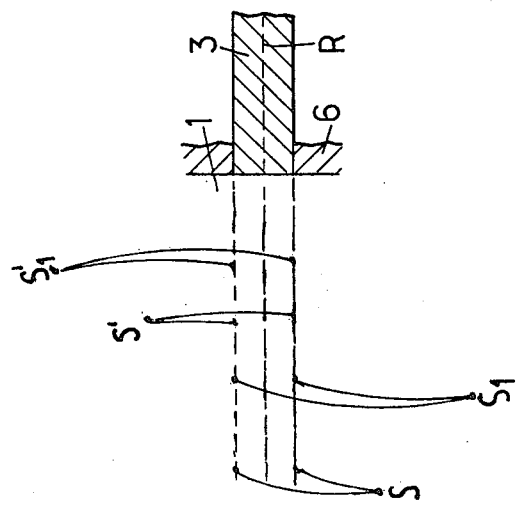
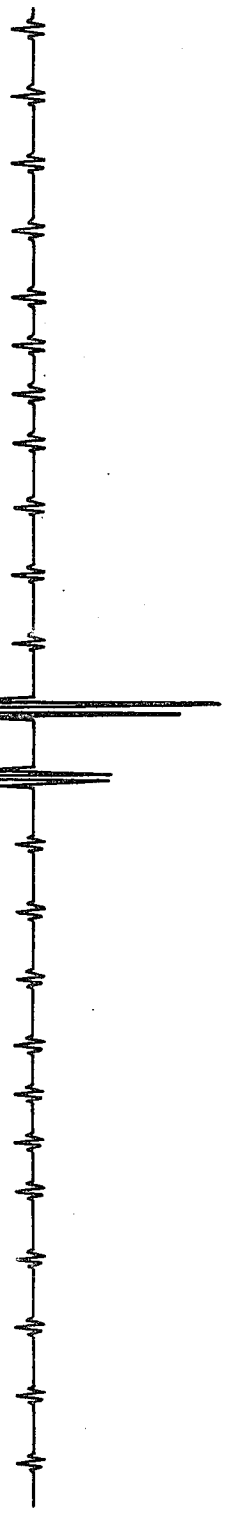
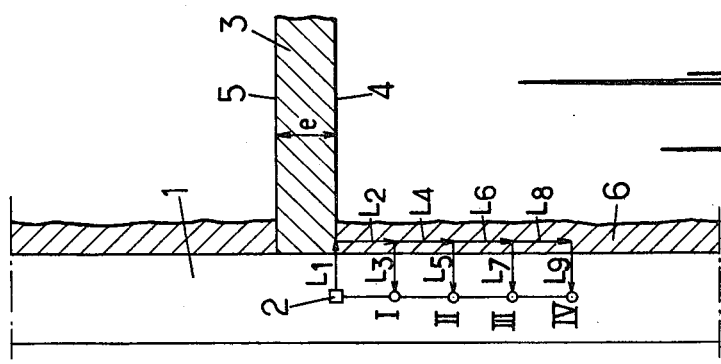
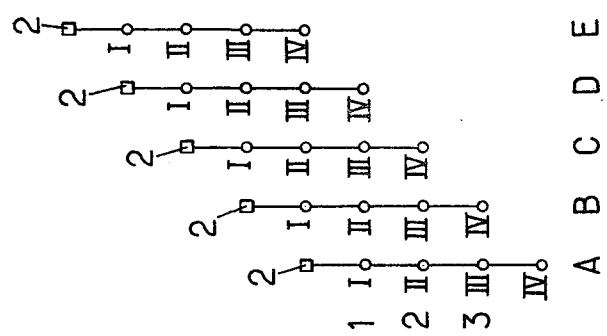

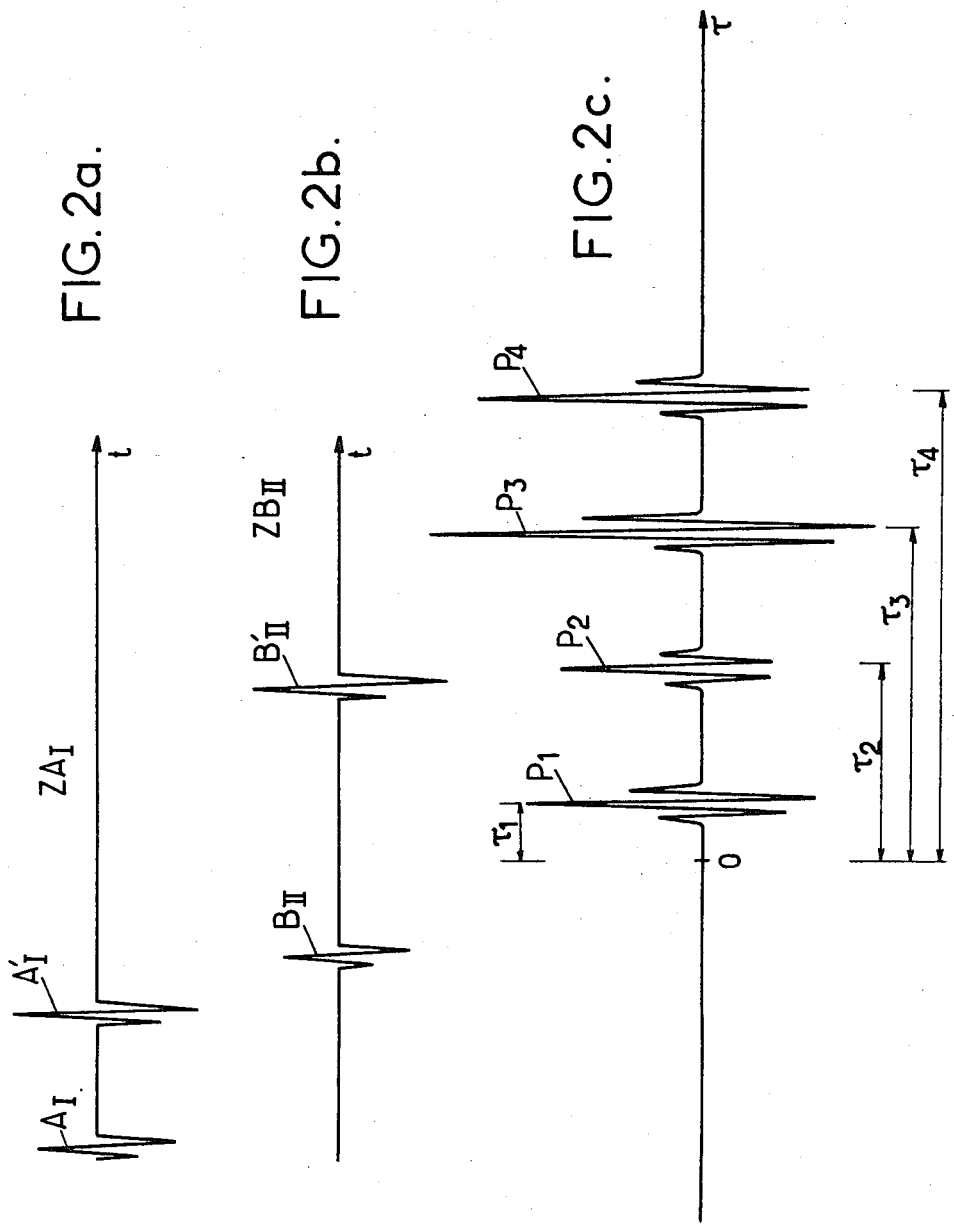

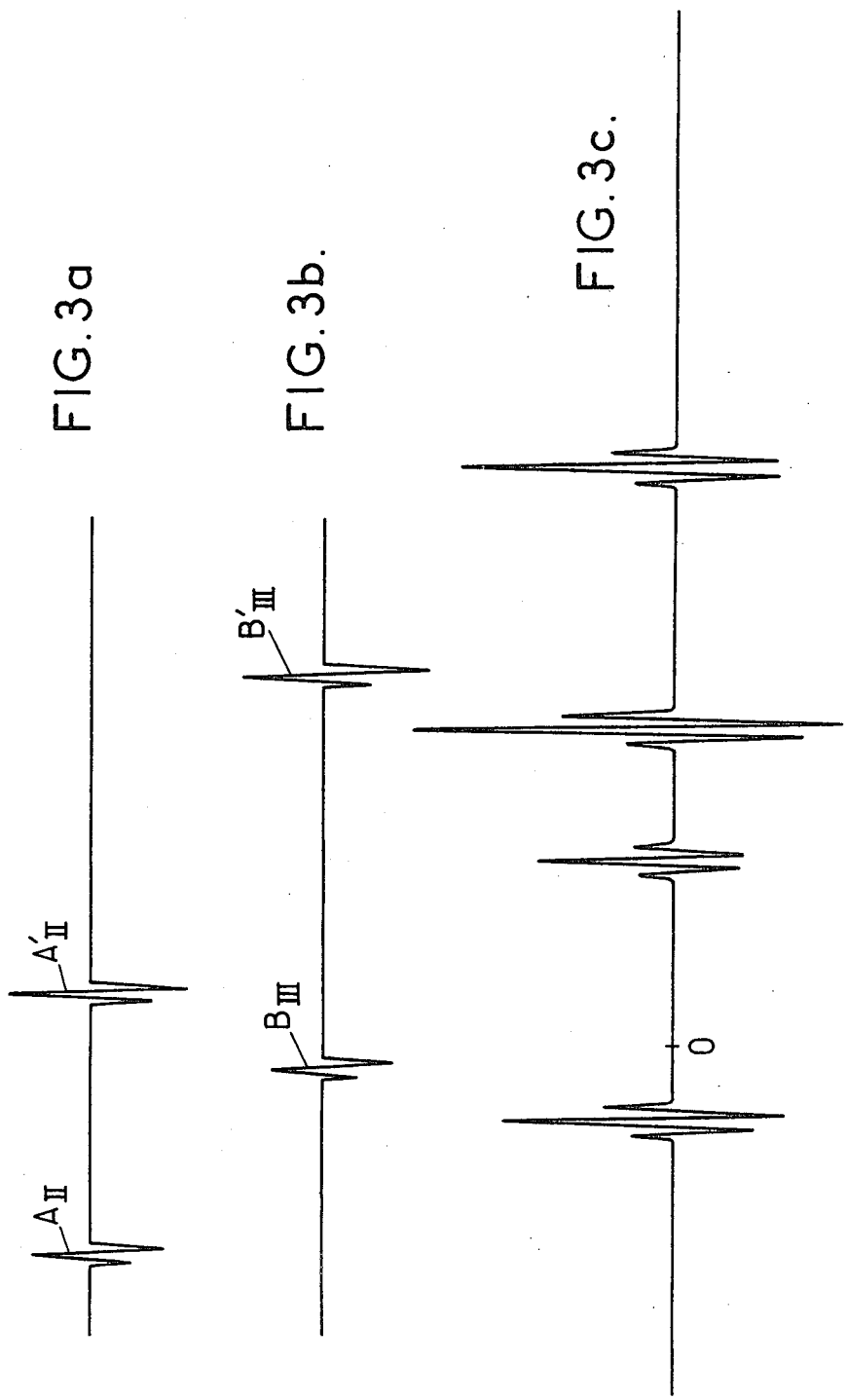

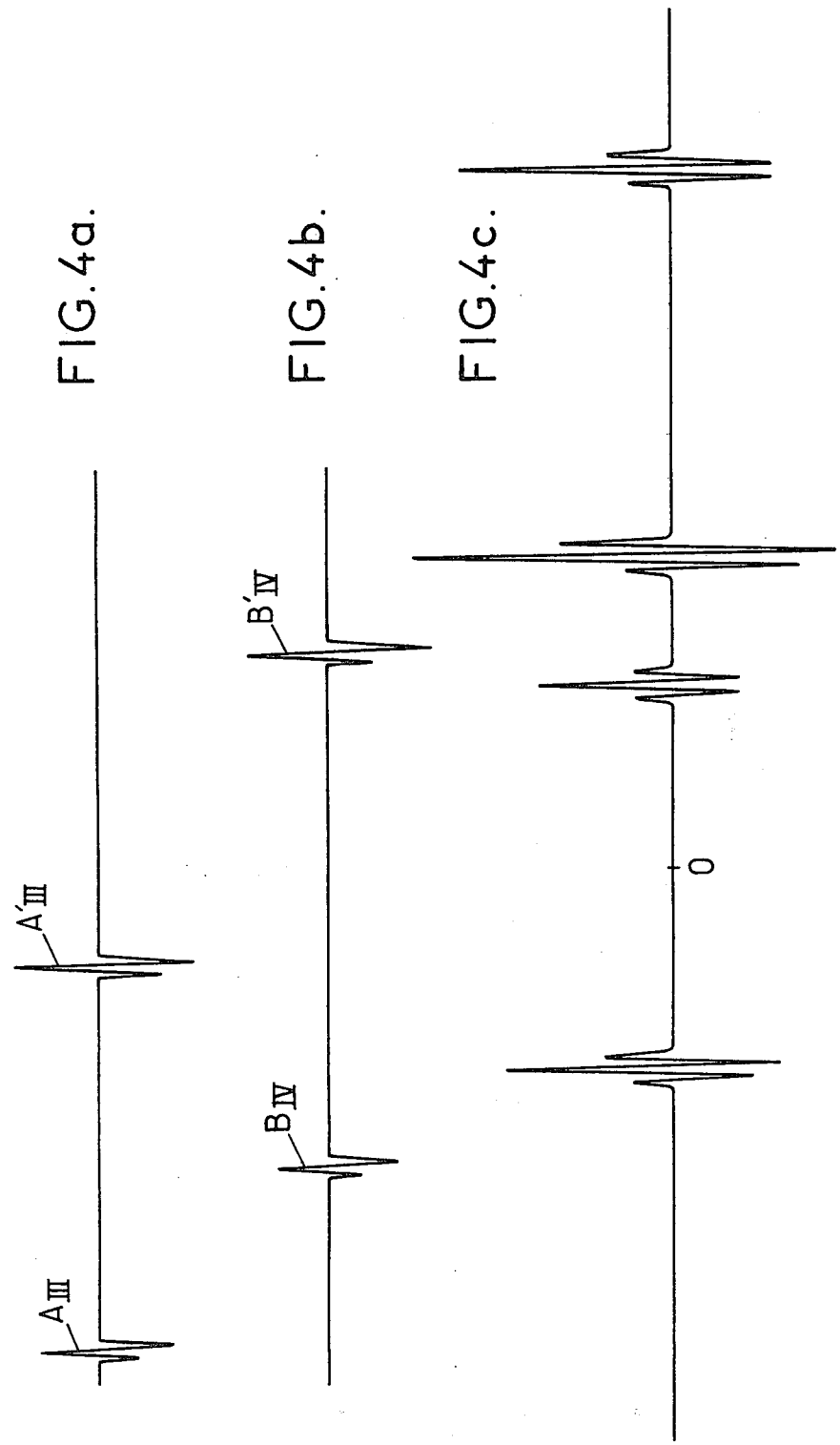

4,460,986

METHOD OF SEISMIC EXPLORATION USING ACOUSTIC DIAGRAPHY

This is a continuation of application Ser. No. 56,182, filed July 10, 1979, now abandoned.

BACKGROUND OF THE INVENTION

This invention relates to a method of seismic exploration by means of acoustic logging (acoustic logging) of the geological formations transversed by a bore hole so as to obtain in particular a diagram of the speed (velocity) of sound in the geological formations surrounding the bore hole while compensating for irregularities in the diameter of the bore hole.

The classic technique for acoustic logging consists of emitting a sound wave with the aid of a transmitter situated in the bore hole and of receiving this wave, after it has passed across the adjacent geological formations, at a receiver also arranged in the bore hole, at a certain fixed distance from the transmitter. The speed of sound of the wave in the geological formation is obtained by dividing the space between the transmitter and receiver by the propagation time of the wave between the moment of transmission and the moment of arrival of the wave at the receiver.

A known method consists of using an electronic system which determines the moment when the amplitude of the signal received at the receiver exceeds a certain threshold, this moment being used to correspond to the moment of arrival of a wave at the receiver.

The most important disadvantage of this type of method lies in the choice of the method of detection of that moment of arrival constituted by passing a threshold. In fact, if the threshold is too low, the electronic system may be triggered by a propagation noise which is not a sound wave to be detected; if the threshold is too high the electronic system is not triggered even on arrival of a wave or, is triggered after a delay.

Moreover, if there are several incoming waves of different types at different moments, for example a longitudinal wave, a transverse wave, a channel wave, then, strictly speaking, correct triggering can only be achieved for the first arrival or detection.

In order to reduce these disadvantages, a method and device for acoustic logging has been proposed as a result of which moreover the parasitic path times in the drilling sludge, up to the wall of the bore hole, are eliminated. These devices and this method are described in U.S. Pat. No. 3,302,166 or French Pat. No. 1,432,012. Briefly the device comprises a transmitter with two receivers on either side of it the method consisting of recording the moments of arrival at different receivers, delaying the output signals of two receivers and then combining these delayed output signals with the output signals of the two other receivers so to produce a diagram of the speed of sound in the ground as a function of depth.

One disadvantage of this method lies in the fact that the different measurements and positioning of the device require very fine control since lowering and raising the device between two consecutive transmissions must be carried out so that the receiver of one of the pairs, which is adjacent the transmitter, takes up the position of the farthest receiver of the other pair, each time a discontinuity, such as a cavity, appears in the wall of the drill hole. Another disadvantage lies in the fact that this device only provides information regarding the passage time of a wave losing completely other interesting information such as the shape of this wave, its amplitude, its frequency and the variation in its characteristics as a function of the distance between the transmitter and receiver.

SUMMARY OF THE INVENTION

It is an object of the invention to reduce these disadvantages mentioned above and to provide a method of acoustic logging which makes it possible to recognise and study not only a particular wave crossing the geological layers of the formation surrounding the bore hole but also all of the other waves which are able to be propagated in these layers, as well as their characteristics. This enables performing acoustic logging in bore holes provided with tubing, which was not possible using earlier methods.

According to the invention, there is provided a method of seismic exploration comprising the steps of transmitting sound waves from a transmitter to a receiver over at least two sound paths of different lengths, recording all of the signals received by the receiver from each transmission, logging on each recording the respective positions of the transmitter and receiver at the moment of transmission, grouping the recordings in pairs such that each path of the recording has a common path segment and a part facing a geological layer of interest not in common and measuring the arrival times of at least one type of sound wave for each pair of recordings.

BRIEF DESCRIPTION OF THE DRAWINGS

The invention will now be described in greater detail, by way of example, with reference to the drawings, in which:

FIG. 1 shows a schematic view in which the right hand part represents a bore hole and a portion of geological layer which is of interest as well as the initial position of the logging device for the left hand part of the drawing showing the different positions of the device in the bore hole.

FIGS. 2a to 2c respectively show the recording of the signals received at the receiver I in position A, the recording of the signals received at receiver II in position B, and the elementary function of inter-correlation of the recordings of FIGS. 2a and 2b on a reduced scale;

FIGS. 3a to 3c are diagrams similar to those of FIGS. 2a to 2c but are for other receivers of the device;

FIGS. 4a to 4c are diagrams similar to those of FIGS. 2a to 2c and 3a to 3c but for yet further receivers of the device;

FIG. 5 shows the sum of the elementary intercorrelation functions obtained with a device having 12 receivers, but on a reduced scale, and FIG. 6 shows a very schematic view of a measurement carried out with a device arranged symetrically in relation to the median plane of a given geological layer.

DESCRIPTION OF THE PREFERRED EMBODIMENTS

One simple embodiment of the object in accordance with the invention is shown in FIG. 1 and consists of installing a device in a bore hole 1, which device comprises transmission means formed by one or more transmitters and receiving means formed by one or more receivers in alignment with the transmitters, the product of the number of transmitters and the number of receivers being at least equal to two and preferably equal to the number of different sound paths which it is desired to use. A device comprising a transmitter 2 and four receivers designated I to IV has been shown in FIG. 1. Preferably the receivers are equidistant and the distance which separates two consecutive receivers is equal to the thickness e of the geological layer 3 of interest, the distance separating the transmitter and its adjacent receiver may be as desired but may also be equal to e.

When the device comprises more than one transmitter, they are preferably equidistant and the distance separating two consecutive transmitters may be the thickness of the geological layer of interest whatever the spacing between the receivers.

Particularly with a device having several equidistant transmitters and several equidistant receivers, the distance between two consecutive transmitters is equal to the distance separating two consecutive receivers divided by the number of transmitters. The logging device designed in this way is arranged at the desired depth and is operated from the surface so as to transmit a sound wave. For the sake of clarity the transmitter 2 has been assumed to be in line with the lower edge 4 of the layer 3. The sound wave transmitted by the transmitter 2 follows a path $L_1$, $L_2$ and $L_3$ in the geological layers located below the layer 3 before arriving at the receiver I. Similarly the wave follows a path $L_1$, $L_2$, $L_4$ and $L_5$ before reaching the receiver II and so on as shown in the right hand part of FIG. 1. Whatever the position corresponding to the initial position A of the device in the bore hole up to position E of the device, the sound wave paths have a common part. While the paths of these sound waves may have been shown in the penetrated region 6 around the drill bore 1, it is clear that in reality these paths pass through the penetrated region 6 and reach more distant regions when a device having several transmitters and/or receivers is used.

After the first transmission, a recording device, located at the surface and connected to the receivers I, II, III, IV, etc. of the device, records signals which are analogous to those shown in FIGS. 2a, 2b; 3a, 3b; 4a; 4b received by the receivers. These recordings are marked in an appropriate manner in order to find again, after treatment, the respective positions of the transmitter receiver pair, which correspond to each of the recordings. The recording shown in FIG. 2a for example, will be marked $ZA_I$, where ZA designates the position of the transmitter 2 in the bore hole at the position A, the reference I meaning that it is a signal delivered by the receiver I which has been recorded. In the same way the signals of FIGS. 3a and 4a will be marked $ZA_{II}$, $ZA_{III}$. For another position of the transmitter 2, B for example, the recording of the signal delivered by receiver M (I, II, III etc) will be marked $ZB_M$ and so on for the other positions C, D, E, etc of the transmitter 2 in the bore hole.

After the recordings for position A of the device are terminated, the transmitter 2 is raised until it occupies the position B, at which point the transmitter 2 is in line with the upper surface 5 of the layer 3. Then a sound wave is transmitted again and the signals delivered by the different receivers are again recorded. Recordings similar to those shown respectively in FIGS. 2b, 3b and 4b and marked $ZB_{II}$, $ZB_{III}$, $ZB_{IV}$, etc are obtained for the receivers II to IV.

Then the device is displaced again and a sound wave is transmitted re-starting the preceding operations which continue until the device occupies the position E, for example.

For a given type of wave, a longitudinal transverse wave for example, the path times $\Delta t$ in the layer 3 may be evaluated in different ways as a function of the arrival times T of the waves at different receivers and for different positions A, B, C, D, E of the transmitter 2.

Thus by making one of the differences $TB_{II} - TA_I$, (Arrival time at the receiver II in the position B of the transmitter minus the arrival times at the receiver I in the postion A of the transmitter), $TB_{III} - TA_{II}$, $TB_{IV} - TA_{III}$, $TC_{II} - TC_I$, $TD_{III} - TD_{II}$ or $TE_{IV} - TE_{III}$ the path times $\Delta t$ are obtained while eliminating the affect of the paths $L_1$, $L_3$, $L_5$, $L_7$ and $L_9$ in the drilling sludge in the case where the bore hole 1 is perfectly cylindrical.

When the bore hole 1 is not cylndrical and has a discontinuity or cavity in line with a receiver it is sufficient to calculate the result of one of the operations;

$$\frac{TB_{II} - TA_I + TC_{II} - TC_I}{2} \text{ or}$$

$$\frac{TB_{III} - TA_{II} + TD_{III} - TD_{II}}{2} \text{ or}$$

$$\frac{TB_{IV} - TA_{III} + TE_{IV} - TE_{III}}{2}$$

in order to eliminate the effects of these cavities $\Delta t$.

In a particular method, the transmission of sound waves are effected at regular intervals of time while raising the device at a constant speed.

The sequence of transmission is such that, taking into account the speed at which the device is raised, the displacement of the device between consecutive transmissions is negligible in relation to the thickness e of the geological layer of interest; this displacement is on the order of magnitude of 1 cm as compared to the thickness e of 1 m. Under these conditions one may say that the position of the device has scarcely varied in order to obtain the desired number of sound paths.

Raising the device continuously at a transmission sequence as mentioned above makes it possible to obtain a larger number of sound paths than is desired because these paths relate to overlapping substrata.

In another embodiment of the invention the device comprises at least two transmitters transmitting at different frequencies, one transmitter whose frequency is 20 kHz, such as the transmitter 2, and a transmitter (not shown) transmitting at 30 kHz or more.

In accordance with the invention the recordings are rearranged in a series formed by all of the recordings corresponding to the sound paths which have a common path segment, the other recordings being eliminated. For example, the recordings $ZA_I$ of the receiver I in the position A and $ZB_{II}$ of the receiver II in the position B form part of this first series because the two sound paths, one passing from transmitter 2 to the receiver I for position A and, the other passing from the transmitter 2 to the receiver II in position B, have a common path segment; ie the same position vertically or the receiver II and the receiver I being in the same position for two different positions of the device. On the other hand the recordings $ZA_{II}$ and $ZB_{II}$ which correspond to the two paths transmitter 2 to receiver II, position A and transmitter 2 to receiver II position B, will not appear in this first series as they do not have a common path segment.

Then, for each geological layer 3 of interest, these recordings are grouped in twos so as to form pairs in which the recordings correspond to two sound paths which have a common path segment and a part which is not common to both located facing or in line with the layer. Thus the recordings $ZB_{II}$ of the receiver II, position B and $ZA_1$ of the receiver I, position A; or $ZB_{III}$ of the receiver III, position B and $ZA_{II}$ of receiver II, position A form part of this second series while the recordings $ZB_{II}$ and $ZB_I$ of the receivers II and I for the position B will be eliminated even though the sound paths have a common path segment; the position B corresponding to the position ZB of the transmitter 2. This second selection being carried out a series of pairs of recordings are obtained which fulfill a dual condition; a single path segment in common between the sound paths and a part of the said paths which is not common in line with the layer 3. Three of these pairs in the series are shown in FIGS. 2a, 2b; 3a, 3b; 4a, 4b.

It is clear that the necessary duplication of recordings will be implemented because, each sound path having two segments, each selected recording will be able to belong to several different pairs.

FIG. 2a is the recording $ZA_I$ of the transverse $A_I$ and longitudinal $A'_I$ waves received by the receiver I in the position A (position ZA) and FIG. 2b is the recording $ZB_{II}$ of the transverse and longitudinal waves $B_{II}$ and $B'_{II}$ received by the receiver II in position B (position ZB). FIGS. 3a and 3b respectively are recordings $ZA_{II}$ of the transverse wave $A_{II}$ and longitudinal wave $A'_{II}$ received by the receiver II in the position A of the device and $ZB_{III}$ of the transverse wave $B_{III}$ and longitudinal wave $B'_{III}$ received by the reciever III in the position B of the device. Similarly the pair of recordings $ZA_{III}$ and $ZB_{IV}$ of FIGS. 4a and 4b corresponds to the signals received by the receiver III for the position A and by the receiver IV in the position B.

These various rearrangements having been implemented, the different path times are measured at the receivers directly on the recordings. If an interest is only taken in the longitudinal wave, the distance separating the peaks $A'_I$ and $B'_{II}$ are measured, and taking into account the time scale t which has been selected, and the path time $\Delta t$ of the longitudinal wave in the layer 3 is directly obtained. This measurement may also be implemented based on recordings of the pair shown in FIGS. 3a–3b where the distance between the peak $A'_{II}$ and $B'_{III}$ is equal to that between the peaks $A'_I$ and $B'_{II}$.

The same relative measurements at the transverse wave in the layer 3 makes it possible to confirm that the distance between the peaks $A_I$ and $B_{II}$ is equal to that separating the peaks $A_{II}$ and $B_{III}$. In relation to a given geological layer it may be that the device is conceived and displaced in the manner shown schematically in FIG. 6 where the sound paths are shown by continuous lines. In this case for the same given layer 3 one would have four pairs of recordings which satisfy the dual condition mentioned previously. When operating under these conditions, the recording pairs are re-grouped by connecting two symmetrical pairs such as S and S' or $S_1$ and $S'_1$, ie the part which is not common to both of the sound paths is in line with the said layer and the common extremity of the paths is symmetrical in relation to the median plane R of the said layer. By averaging the common path segment measurements above S' and the common path segment measurements below S a measurement which is free of the effects of the paths in the sludge and free of the regularities in the wall of the drill hole is obtained, said measurement being connected with the distance of the common segment of the sound paths in the median plane of the layer.

In reality, adjacent the peaks $A_I$, $A'_I$, B, $B'_{II}$ there are other parasitic peaks corresponding to noise the amplitude of the parasite peaks being possible sometimes of the same order as the amplitudes of the longitudinal and transverse waves.

In order to eliminate these parasitic peaks and thus the noise, the cross-correlation of the two recordings of a pair (FIG. 2c) is calculated manually or mechanically for each pair of recordings.

Based on the graph which is representative of the cross-correlation function as a function of time as shown in FIG. 2c and with the aid of recordings FIGS. 2a and 2b the nature of the different peaks of the said cross-correlation function is determined.

With reference to the origin 0 of the time is displacement $\tau$, there is the peak P which is the result of correlation of peaks $A'_I$ and $B_{II}$, the abscissa $\tau_1$ of the peak $P_1$ being equal to the difference in time separating the peaks $A'_I$ and $B_{II}$. The peak $P_2$ is the result of correlation of the peaks $A_I$ and $B_{II}$ and its abscissa $\tau_2$ is equal to the difference in time separting the peaks $A_I$ and $B_{II}$. The peak $P_3$ is the result of correlation of the peaks $A'_I$ and $B'_{II}$ of which the abscissa thereof $\tau_3$ is equal to the difference in time separating these two peaks. Finally the peak $P_4$ is the result of correlation of the peaks $A_I$ and $B'_{II}$ and its abscissa $\tau_4$ is the difference in time separating these two peaks.

For each pair of recordings, the elementary correlation function is calculated as shown in FIGS. 2c, 3c, 4c, etc, the number of elementary cross-correlation functions being equal to the number of selected pairs of recordings.

In order to distinguish the interesting peaks relating to the different types of waves, the sum of the elementary cross-correlation function, of which the non common part of the sound path faces the geological layer of interest is calculated. In fact in such a sum such as that shown in FIG. 5 but on a reduced scale, the peaks corresponding to the results of correlation of the same type of wave where the abscissae are noticeably the same from one elementary cross-correlation function to the next are added together while the parasite phenomena due to noise and the results of correlation of two different types of wave, where the abscissae are different from one elementary correlation to the next are not added but are dispersed to the different abscissae on the time displacement axis.

On the cross-correlation function sum corresponding to each geological layer, the abscissae of different peaks correspond to passage times of the different waves in the said layer.

For each type of transverse longitudinal or other wave a diagram is established representing the passage times thus determining functionally the position of the median plane of the explored layer in the drill bore, the said diagram usually called the "sound log of the explored formation". Based on diagrams plotted in this way, there are elements which make it possible to calculate the propagation speeds of the different types of waves in the formation explored and to determine the "log" for the sound speed for each type of wave.

It should be noted that the recordings obtained in accordance with the method described above make it possible to study the amplitudes of the waves received and thus the attenuation of these waves in the different layers explored. In order to do this, the recordings obtained at different frequencies are used in particular and for each type of wave the attenuation "logs" are prepared for the different frequencies. This makes it possible to pick up interesting information in estimating the porosity, permeability and fluid content of the layers explored.

In the above described embodiments, the propagation noises are eliminated and only the maxima corresponding to the different waves received are accepted. This makes it possible to study the characteristics of the waves more thoroughly. Finally and more particularly there is no risk of falsifying the information sought after by means of inappropriate detection controls since, on the one hand, the receivers record all the signals whatever their shape and amplitude and on the other hand the treatment of the recordings makes it possible to make a better choice of the waves to be studied. From this it is apparent that the speed diagram obtained in accordance with the invention is much more precise and representative of the geological layers explored.

It will be understood that the above description of the present invention is susceptible to various modification changes and adaptations.

What is claimed is:

1. An acoustic well logging method comprising the steps of transmitting acoustic waves from a transmitter to at least three receivers over at least three acoustic paths of different lengths, recording all of the signals received by the receivers from each transmission, logging on each recording the respective positions of the transmitter and receivers at the moment of transmission corresponding to said each recording, grouping the recordings in pairs such that said pairs have path segments facing the same geological layer of interest, the acoustic paths corresponding to the recordings of each pair having a common path segment and part not in common facing said geological layer of interest, determining for each type of wave of interest the difference between the arrival times of said wave of interest on the recordings of each pair by cross correlating the recorded signals of each pair of recordings, and summing the cross correlation functions for each geological layer.

2. A method as defined in claim 1 and comprising grouping said recording pairs such that for each group of pairs the part not in common of the recordings of one pair is identical to the part not in common of the recordings of the other pair, and the common path segment of the recordings of one pair is symmetrical to the common path segment of the recordings of the other pair about a median plane of the geological layer corresponding to said part not in common.

3. A method as defined in claim 1 and comprising averaging the times of the acoustic paths ascertained for each geological layer.

4. An acoustical logging system comprising:
   (a) a downhole instrument having a group of at least two first communication components and a group of at least two second communication components spaced along a vertical line, one of said groups being receivers and the other of said groups being transmitters, said first communication components being equally spaced from each other and said second communication components being equally spaced from each other,
   (b) the distance between two consecutive first communication components being determined by: the value of the ratio defined by the distance between two second communication components and the number of first communication components of the downhole instrument; and the thickness of the geological layer of interest,
   (c) a cable means for suspending the downhole instrument in a borehole,
   (d) a depth measuring means disposed to measure the depth of the downhole instrument in the borehole, and
   (e) a recording system for recording each of the signals received on said receivers.

5. A device as defined in claim 4, wherein at least one of the transmitters transmits at a frequency different from the others.

* * * * *